March 9, 1926.
G. COOK
1,576,233
AUTOMATIC FISHING DEVICE
Filed June 8, 1925
2 Sheets-Sheet 1
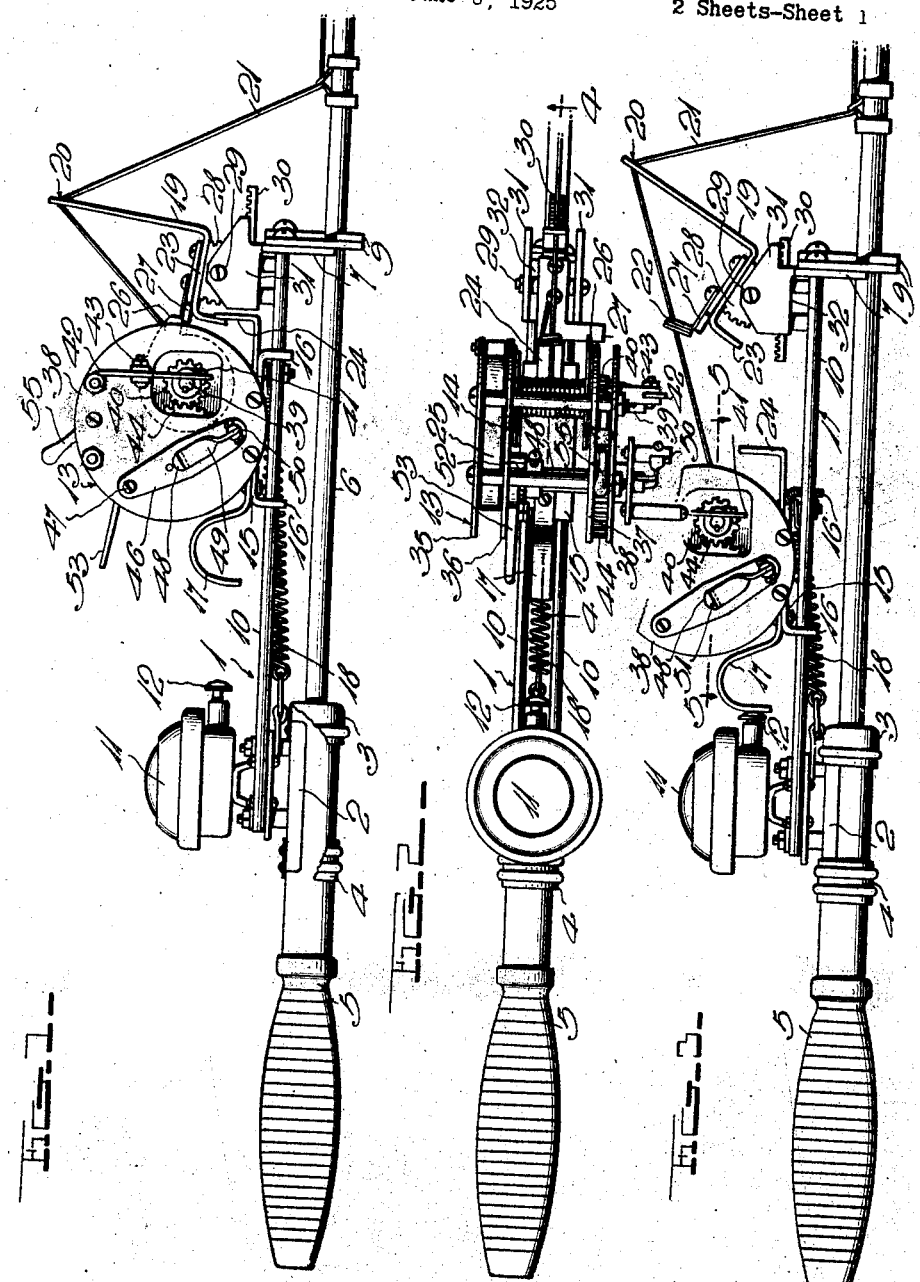
Witness
H. Woodard
Inventor
George Cook
By H. B. Wilson & Co.
Attorneys March 9, 1926.
G. COOK
AUTOMATIC FISHING DEVICE
Filed June 8, 1925
1,576,233
2 Sheets-Sheet 2
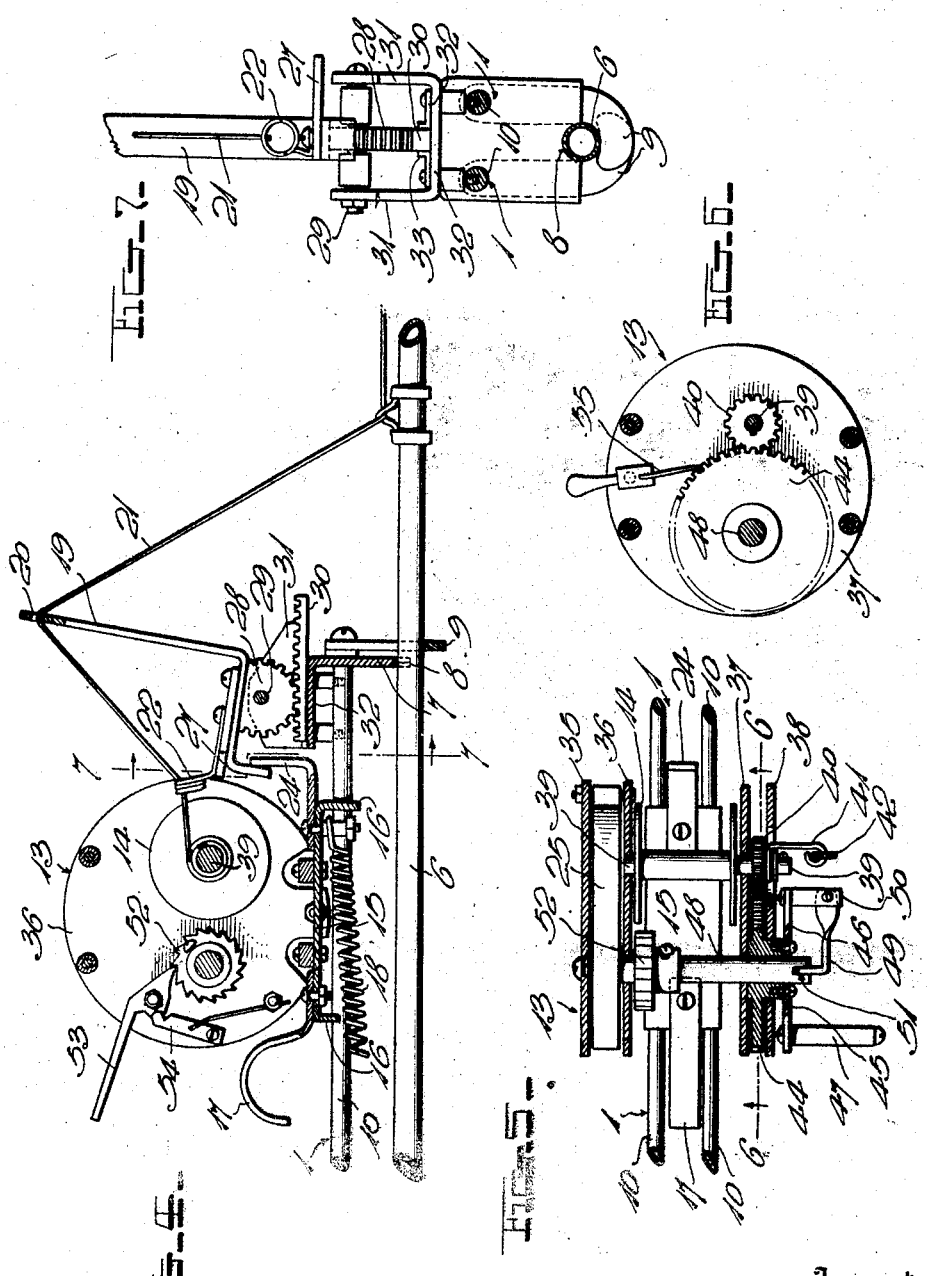
Witness
H. Woodard
Inventor
George Cook
By H. B. Willson & Co.
Attorneys Patented Mar. 9, 1926.

1,576,233

UNITED STATES PATENT OFFICE.

GEORGE COOK, OF DETROIT, MICHIGAN.

AUTOMATIC FISHING DEVICE.

Application filed June 8, 1925. Serial No. 35,685.

*To all whom it may concern:*

Be it known that I, GEORGE COOK, a citizen of the United States, residing at Detroit, in the county of Wayne and State of Michigan, have invented certain new and useful Improvements in Automatic Fishing Devices; and I do declare the following to be a full, clear, and exact description of the invention, such as will enable others skilled in the art to which it appertains to make and use the same.

My invention relates to improvements in fiishing devices of the general type disclosed by my U. S. Patent No. 657,518 of September 11, 1900, and the object of the present invention is to generally improve upon and thus provide a better commercial device than that shown by the patent in question.

With the foregoing in view, the invention resides in the novel subject matter hereinafter described and claimed, the description being supplemented by the accompanying drawings.

Figure 1 is a side elevation of the improved device applied to an ordinary fishing pole, the usual reel-holding sleeves of the pole being partly broken away and in section to clearly illustrate the manner in which the improved device is partially held in place thereby.

Figure 2 is a top plan view of the parts shown in Fig. 1.

Figure 3 is a view similar to Fig. 1, but showing the device in fish-catching condition, whereas in Fig. 1 it is merely set.

Figure 4 is a vertical longitudinal sectional view as indicated by line 4—4 of Fig. 2.

Figure 5 is a horizontal sectional view on line 5—5 of Fig. 3.

Figure 6 is a vertical longitudinal section as indicated by line 6—6 of Fig. 5.

Figure 7 is a vertical transverse sectional view taken substantially on line 7—7 of Fig. 4.

In the drawings above briefly described, the numeral 1 designates an elongated guideway having at its rear end a transversely curved, elongated plate 2 which is adapted for engagement with the usual stationary and movable sleeves 3 and 4 of a fishing rod handle 5, said sleeves being commonly used for holding a reel upon the handle. At the front end of the guideway 1, provision is made for connecting said guideway with the fishing rod 6, at a point in advance of the handle 5. Preferably, a metal plate 7 extends downwardly from the guideway and is provided in its lower edge with a notch or seat 8 to receive the upper portion of the rod 6, and to hold said seat engaged with the rod, I prefer to employ a pair of rod-engaging hooks 9 pivoted to the plate 7. Preferably, the guideway 1 comprises two parallel rods or rails 10, suitably secured at their front ends to the plate 7, and anchored in any adequate manner at their rear ends to the plate 2. Mounted adjacent these rear ends, is a spring-actuated bell 11 having a push button 12 which brings it into play, for a purpose to be hereinafter described.

A reel frame 13, having a line winding reel 14, is slidable along the guideway 1, and in the present disclosure, said frame 13 is provided with a base plate 15 having downwardly turned ends 16 which are formed with openings through which the rails 10 pass slidably. The base plate 15 is provided with an arched spring 17 which is adapted to strike the push button 12 and bring the bell 11 into operation, when the frame 13 is slid rearwardly along the guideway 1, under the influence of appropriate springs means 18. A latch lever 19, however, is provided at the front end of the guideway 1 to normally hold the frame 13 at the front end of said guideway, as disclosed in Fig. 1, and the upper end of said lever 19 is formed with an eye 20 through which the fishing line 21 passes. Preferably, another guide eye 22 is also provided near the lower end of the lever 19. When the lever 19 stands as shown in Fig. 1, a downwardly projecting finger 23 thereof, engages behind an upwardly projecting finger 24 on the base plate 15, to hold the reel frame 13 at the front end of the guideway 1, but when a fish pulls upon the fish hook on the end of the line 21, the latter releases the latching lever 19, as shown in Fig. 3, thus allowing the spring 18 to jerk the reel frame 13 rearwardly, so as to forcibly engage the hook with the fish's mouth. At the same time, the spring 17 yieldably cushions the rearward movement of the frame 13 and effects ringing of the bell 11. Also, due to provision hereinafter described, the reel 14 is automatically turned to wind the line 21, as soon as the frame 13 starts toward its rearward position.

A spiral spring 25 is provided for driving the reel 14 in line winding direction, as soon as rotation of this reel is permitted. The reel however, is provided with a projection or stop 26 which engages a lateral stop 27 on the lever 19, when the frame 13 is secured at its foremost position, as shown in Figs. 1 and 2. Thus, the reel 14 is held against turning, but as soon as said reel is moved rearwardly by rearward shifting of the frame 13 under the influence of the spring 18, the stop 26 disengages from the stop 27, thus permitting the spring 25 to rotate the reel 14 and wind the line thereon, so as to draw in the fish which has been caught.

A novel construction and arrangement of parts is provided for setting the latch lever 19 in engagement with the finger 24, when the frame 13 is forced forwardly by hand. This lever is provided with a gear segment 28 concentric with its fulcrum or pivot 29, and meshing with said segment, is a longitudinal rack bar 30 which is in the forward path of the finger 24, when the parts stand as in Fig. 3. Thus, when the frame 13 is forced forwardly, finger 24 slides the rack bar 30, causing turning of the gear segment 28 and consequently swinging the latch 19 rearwardly until its finger 23 engages behind the finger 24. The frame 13 may then be released and it will be held in its foremost position by the above-named latch lever.

In the preferred form of construction, the segment 28 is mounted between parallel flanges 31 which rise from the horizontal arm 32 of an inverted L-shaped plate which is suitably secured to the front end of the guideway 1, and the vertical arm of said plate may well form the member 7, above referred to. The rack bar 30 rests slidably upon the arm 32, and appropriate guide strips 33 are secured to said arm, to guide said rack bar.

The reel frame 13 preferably comprises one pair of vertical plates 35 and 36 and another pair of vertical plates 37 and 38, suitably connected with each other in any desired manner. The plates 36 and 37 are disposed at the ends of the reel 14, and the shaft 39 of this reel passes through openings in them. Slidably splined on the shaft 39, between the plates 37 and 38, is a pinion 40 which may be slid inwardly or outwardly by any preferred means. For illustrative purposes, a hub on the pinion 40 is linked at 41 to a lever 42 which is fulcrumed at 43 upon the plate 38. The pinion 40 is adapted to be moved into or out of mesh with a gear 44 disposed between the plates 37 and 38, said gear having a hub 45 which extends through an opening in said plate 38 and is suitably secured to the intermediate portion of a handle bar 46, said handle bar having a finger-piece 47 at one end. The hub 45 is rotatable upon a winding shaft 48 for the spring 25, the latter being housed between the plates 35 and 36, and to establish a driving connection between the bar 46 and the shaft 48, I have provided a clutch member 49 which is pivoted to a post 50 on the end of the bar 46 remote from the finger-piece 47, the free end of said clutch member 49 being receivable in a kerf 51 in the adjacent end of the shaft 48. When the pinion 40 is out of mesh with the gear 44 and the clutch member 49 is in operative engagement with the shaft 48, rotation of the handle will cause the shaft 48 to wind the spring 25, and retrograde motion of said shaft and spring is then prevented by a suitable ratchet wheel 52 and a pawl 53 co-operable therewith, a suitable spring-pressed device 54 being provided for holding said pawl either in operative or released position, as occasion may demand. After the spring is wound, and is held by the pawl 53, the clutch member 49 may be disengaged from the shaft 48 and the gear 40 may then be placed in mesh with the gear 44. With the parts in this condition, the entire frame 13 may be slid forwardly and latched as shown in Fig. 1, whereupon the stops 26 and 27 will co-operate to hold the reel 14 against turning, so that the pawl 53 may then be released. When this is done, the above-named stops 26 and 27 are the only means acting to prevent rotation of the reel 14 under the influence of the spring 25. Thus, it will be seen, that whenever a fish jerks upon the line 21 and releases the latch lever 19, the reel 14 is freed, so that it is immediately rotated in line-winding direction under the influence of the spring 25, and at the same time, the frame 13 moves rearwardly under the action of the spring 18. The fish hook is thus tightly engaged with the fish's mouth and the spring 17 engages the push button 12, setting the alarm 11 in operation and notifying the attendant that a fish has been caught and is being drawn in.

Whenever it is desired to cast, the shaft 48 is of course held against rotation by the pawl 53, and the pinion 40 may then be disengaged from the gear 44, leaving the reel 14 free to spin, and if this reel is to be rotated in line-winding direction, by hand, the gears 40 and 44 are meshed with each other, and it is made certain that the clutch member 49 is not in engagement with the shaft 48. Then, turning of the handle will cause the gears to rotate the reel, said handle being turned in a counter-clockwise direction for hand winding.

If desired, a suitable drag, designated in a general way by the character 55, may be provided to co-act with one of the gears.

It will be seen from the foregoing that I have greatly improved the construction previously provided, and that the new structure may be quickly and easily applied to or detached from an ordinary fishing rod. Moreover, the device may be more easily set than previously, and as soon as the reel frame is released to slide rearwardly, the spring-actuated reel is automatically brought into play, whereas in my prior device, the reel was necessarily set by hand.

As excellent results may be obtained from the general construction disclosed, it may well be followed, but it is to be understood that the present disclosure is for illustrative purposes only, and that within the scope of the invention as claimed, numerous modifications may be made.

I claim:

1. In a fishing device having an elongated guideway, a line reel slidable along said guideway, line-released means for normally holding the reel at the front end of the guideway, and spring means for sliding the reel toward the rear end of the guideway when said holding means is released; an elongated plate secured to one end of said guideway and adapted to be held by the usual reel-holding sleeves of a fishing rod handle, a plate projecting laterally from the other end of said guideway and having a seat adapted to rest on the rod in advance of the handle, and hook means pivoted on said plate for engagement with the rod to hold the latter and the seat in engagement with each other.

2. In a fishing device having an elongated guideway, a line reel slidable along said guideway, line-released means for normally holding the reel at the front end of the guideway, and spring means for sliding the reel toward the rear end of the guideway when said holding means is released; a spring carried by the reel to strike and actuate an alarm, said spring acting also as a yieldable bumper to check the movement of the reel under the influence of the aforesaid spring means.

3. In a fishing device having a guideway, a reel frame movable along said guideway and carrying a spring-wound reel, a relatively stationary line-released latch for normally holding the frame at the front end of the guideway, and spring means for moving said frame toward the rear end of the guideway when the latch is released; means for normally holding the reel against line-winding and for automatically releasing it to perform its line-winding function when said reel is moved rearwardly.

4. In a fishing device having a guideway, a reel frame movable along said guideway and carrying a spring-wound reel, a relatively stationary line-released latch for normally holding the frame at the front end of the guideway, and spring means for moving said frame toward the rear end of the guideway when the latch is released; co-acting stops on said reel and latch for holding the reel against line-winding movement until the latch is released.

5. In a fishing device having a guideway, a reel frame movable along said guideway and carrying a spring-wound reel, a relatively stationary line-released pivotally mounted latch for normally holding the reel frame at the front end of the guideway, and spring means for moving said frame toward the rear end of the guideway when the latch is released; a gear segment connected with said latch in concentric relation with its pivot, and a rack bar in mesh with said segment, said rack bar being slidably mounted in position to be struck and longitudinally slid by the reel frame when the latter is moved forwardly, the sliding movement of said rack bar then serving to turn said gear segment and operatively engage the latch with the reel frame.

6. In a fishing device, a guideway having means at its rear end for connecting it to a fishing rod, a reel slidable along said guideway, spring means for rearwardly sliding said reel, an inverted L-shaped plate secured to the front end of said guideway and having its horizontal arm provided with upstanding longitudinal flanges, the lower end of the vertical arm of said plate being adapted to rest on the rod, a line-released latch pivoted between said flanges and having a gear segment, and a rack bar slidably mounted on said horizontal arm and meshing with said gear segment to swing the latch into operative engagement with the reel when said reel is forced forwardly and in turn slides the rack bar forwardly.

In testimony whereof I have hereunto affixed my signature.

GEORGE COOK.